US012386798B2

(12) United States Patent
Tian et al.

(10) Patent No.: US 12,386,798 B2
(45) Date of Patent: Aug. 12, 2025

(54) METHOD AND SYSTEM FOR INTELLIGENT REMOVAL OF MULTI-DIMENSIONAL LOGGING DATA OUTLIERS

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/426,406

(22) Filed: Jan. 30, 2024

(65) Prior Publication Data
US 2025/0181559 A1 Jun. 5, 2025

(30) Foreign Application Priority Data

Sep. 19, 2023 (CN) .......................... 202311205158.8

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2264* (2019.01); *G06N 3/043* (2023.01); *G06N 3/084* (2013.01)

(58) Field of Classification Search
None
See application file for complete search history.

(56) References Cited

FOREIGN PATENT DOCUMENTS

| CN | 113759425 A | 12/2021 |
| CN | 114463333 A | 5/2022 |
| CN | 115842645 A | 3/2023 |

OTHER PUBLICATIONS

Yu (CN-106649339-A), "Method for Mining and Excavation Device of Outliers", May 10, 2017, 13 Pages. (Year: 2017).*
(Continued)

*Primary Examiner* — Bai D Vu
(74) *Attorney, Agent, or Firm* — Nitin Kaushik (57) ABSTRACT

The present invention is in the field of geological measurement, and particularly relates to a method and system for intelligent removal of multi-dimensional logging data outliers, aiming to solve the problem that it is difficult to achieve stable parameter acquisition in the drilling process when there are more outliers in the prior art. The present invention comprises: acquiring a multi-dimensional logging curve; obtaining two-dimensional logging curve data by using the Umap dimensionality reduction algorithm to perform dimensionality reduction; establishing a first data point index of the multi-dimensional logging curve and the two-dimensional logging curve data; obtaining valid logging data by processing outliers with an isolation forest algorithm based on the two-dimensional logging curve data; acquiring a second data point index based on the first data point index and valid logging data; finding marked data points where the second data point index exists in the multi-dimensional logging curve data.

4 Claims, 2 Drawing Sheets

(51) Int. Cl.
  *G06F 16/22* (2019.01)
  *G06N 3/043* (2023.01)
  *G06N 3/084* (2023.01)

(56) References Cited

OTHER PUBLICATIONS

Liu et al. (CN-107944159-A), "A While-drilling Electromagnetic Forward Modeling Simulation Database High Precision Compression Method", Apr. 20, 2018, 12 Pages. (Year: 2018).*
Yuan et al. (CN-111507048-A), "Prediction Method of Gas Permeability of Compact Sandstone Reservoir, Device, Device and System", Aug. 7, 2020, 28 Pages (Year: 2020).*

* cited by examiner

METHOD AND SYSTEM FOR INTELLIGENT REMOVAL OF MULTI-DIMENSIONAL LOGGING DATA OUTLIERS

CROSS-REFERENCE TO RELATED APPLICATIONS

The application claims priority to Chinese patent application No. 2023112051588, filed on Sep. 19, 2023, the entire contents of which are incorporated herein by reference.

TECHNICAL FIELD

The present invention is in the field of geological measurement and particularly relates to a method and system for intelligent removal of multi-dimensional logging data outliers.

BACKGROUND

Geophysical data provide abundant stratigraphic parameters for constructing detailed geological models. The multi-dimensional logging curve data reflects the detailed information of lithology, petrophysical properties, and electrical properties of the formation, and the formation resolution can reach 0.5 m. At present, the vertical lithology distribution can be discriminated in detail based on manual interpretation and machine learning algorithms. In order to realize intelligent and rapid stratum identification and division and locate the target layer, the algorithm models established by researchers become more complex and are greatly affected by the input abnormal data. In order to ensure the stability of the algorithm, it is necessary to establish a suitable algorithm model to remove outliers from multi-dimensional logging curves, so that the input training data can guide the algorithm model updating more effectively. Therefore, this patent takes the original multi-dimensional logging data as the input and uses the machine learning dimensionality reduction algorithm to determine the original data point category as the reference to realize the accurate picking of hyper-parameters of the isolation forest algorithm, so as to quickly remove a large number of multi-dimensional logging data outliers.

SUMMARY

In order to solve the above-mentioned problem in the prior art, namely, the problem in the prior art that it is difficult to achieve stable parameter acquisition in a drilling process with a large amount of abnormal data, the present invention provides a method for intelligent removal of multi-dimensional logging data outliers, the method comprises:

step S100, acquiring multi-dimensional logging curve data;
step S200, obtaining two-dimensional logging curve data by using the Umap dimensionality reduction algorithm to perform dimensionality reduction based on the multi-dimensional logging curve data;
step S300, establishing a first data point index of the multi-dimensional logging curve data and the two-dimensional logging curve data based on the two-dimensional logging curve data;
step S400, obtaining valid logging data by processing outliers with an isolation forest algorithm based on the two-dimensional logging curve data;
step S500, acquiring a second data point index based on the first data point index and valid logging data;
step S600, finding marked data points where the second data point index exists in the multi-dimensional logging curve data based on the second data point index and recording the set of marked data points as standard logging curve data.

In some preferred embodiments, the multi-dimensional logging curve data comprises radioactive gamma ray GR, spontaneous potential SP, caliper CAL, density DEN, compensated neutron log CNL, porosity POR, laterolog deep resistivity RD, and laterolog shallow resistivity RS.

In some preferred embodiments, step S200 specifically comprises:

building local connections: determining hyper-parameters: local_connectivity (the lower limit of the number of adjacent points) setting the weight of the nearest adjacent points as 100%, indicating that the points are fully correlated.

step S210, determining a hyper-parameter of the Umap dimensionality reduction model, comprising a lower limit of the number of adjacent points local_connectivity and the number of neighbor points n_neighbors; the number of neighbor points is to specify how many neighbor points each data point contains;

step S220, setting the weight of the adjacent points contained in the lower limit of the number of adjacent points as 100%;

taking n_neighbors neighbors closest to the current data point as a fuzzy region, setting the weights of the neighbors in the fuzzy region to vary with distance, and setting the weights of data points of non-adjacent points and non-neighbor points as 0;

the weight of the data points in the fuzzy region varying with distance is specifically:

$$p_{j|i} = \exp((-dist(x_i, x_j) - p_j)/\sigma_i);$$

$p_j$ represents a distance between the $j^{th}$ sample point and the closest neighbor point, $\sigma_i$ represents a parameter pre-set according to the distance between the $i^{th}$ sample point and the $j^{th}$ sample point, the $i^{th}$ sample point represents any sample point, $p_{j|i}$ represents a weight of the sample point j with respect to the sample point i, $X_i$ represents a value of the $i^{th}$ sample point, $x_j$ represents a value of the $j^{th}$ sample point, and dist( ) represents a distance;

step S230, combining the edge weights of the data points:

$$p_{j,i} = (p_{j|i} + p_{i|j}) - p_{j|i}p_{i|j};$$

$p_{j|i}$ represents the weight of the sample point j with respect to the sample point i, $p_{i|j}$ represents the weight of the sample point i with respect to the sample point j, and $p_{j,i}$ represents the edge weight of the sample point j and i;

obtaining a weight adjacency graph;

step S240, setting a cross entropy target function based on the weight adjacency graph, and adjusting model parameters via a stochastic gradient descent algorithm until the target function reaches a pre-set threshold value to obtain two-dimensional logging curve data.

In some preferred embodiments, step S240 specifically comprises:

step S241, determining a minimum distance hyper-parameter min_dist based on the weight adjacency graph, representing the closest distance of two points in a low-dimensional space;

step S242, constructing a cross entropy target function based on the minimum distance hyper-parameter min_dist:

$$J = \sum_{e_{i,j} \in \varepsilon} p_{i,j} \log \frac{p_{i,j}}{q_{i,j}} + (1 - p_{i,j}) \log \frac{(1 - p_{i,j})}{(1 - q_{i,j})};$$

J represents a value of a cross entropy target function, $e_{i,j}$ represents two sample points i and j selected from a selected epoch sample set, $\varepsilon$ represents a selected epoch sample set, $p_{i,j}$ represents edge weights of the sample points i and j; $q_{i,j}$ represents a distance between a data point corresponding to the $i^{th}$ sample point in a low-dimensional space and a data point corresponding to the $j^{th}$ sample point in the low-dimensional space; the edge weights comprise direction information;

$$q_{i,j} = \left(1 + a\|z_j - z_i\|^{2b}\right)^{-1};$$

a and b represent parameters determined according to a minimum distance hyper-parameter min_dist;

$$\left(1 + a\|z_j - z_i\|^{2b}\right)^{-1} = \begin{cases} 1 & \|z_j - z_i\| \leq \min\_dist \\ e^{-\|z_j - z_i\| - \min\_dist} & \|z_j - z_i\| > \min\_dist \end{cases};$$

wherein, $z_j$ represents the coordinate of the sample point in the low-dimensional space, and $z_i$ represents the coordinate of the sample point i in the low-dimensional space;

step S243, adjusting model parameters via a stochastic gradient descent algorithm until the target function reaches a pre-set threshold value to obtain two-dimensional logging curve data.

In some preferred embodiments, the first data point index is specifically a one-to-one mapping between a data point in a multi-dimensional logging curve and a data point in a two-dimensional logging curve data.

In some preferred embodiments, step S400 specifically comprises:

step S410, randomly extracting φ data points from the two-dimensional logging curve data X to constitute a data subset X' to be processed and storing same into a root node;

step S420, randomly selecting a dimension q from the two-dimensional logging curve data X, and randomly generating a cut point p in the dimension q; wherein the cut point p satisfies $$\min(x_{ij}, j = q, x_{ij} \in X') < p < \max(x_{ij}, j = q, x_{ij} \in X'),$$

represents a sequence number;

step S430, generating a hyperplane dividing the data in the dimension q into two subspaces according to the cut point p, placing a data point of the dimension q with a numerical value less than p into a first leaf node, and placing a data point with a numerical value greater than or equal to p into a second leaf node;

step S440, recursing the method described in steps S420 to S430 until all the leaf nodes have only one data point or the isolation tree has reached a pre-set height;

step S450, repeating the method described in steps S420 to S440 until T isolation trees are generated; wherein T isolation trees represent: the isolation tree has no external nodes of leaf nodes, or has two leaf nodes $\{T_l, T_r\}$ and an internal node test; an internal node test in T isolation trees is composed of a dimension q and a cutting point p, wherein the point q<p belongs to $T_l$, otherwise belongs to $T_r$;

step S460, the T isolation trees are isolation tree forests, and each data point $X_i$ is traversed through each isolation tree, and the height $h(x_i)$ of the data point $X_i$ in each isolation tree is calculated, namely, the number of edges that the data points $x_i$ pass through from the root node to the leaf node of the isolation tree; then the average height of the data points $x_i$ in the isolation tree forest is calculated, and the average height of all the data points is normalized to obtain the normalized average height $\overline{h(x_i)}$ of the data points;

step S470, calculating an outlier score $s(x, \varphi)$ based on the normalized average height $\overline{h(x_i)}$ of the data points:

$$s(x, \varphi) = 2^{\frac{E(\overline{h(x_i)})}{c(\varphi)}};$$

wherein, $c(\varphi)$ represents an average value of path lengths of a binary tree constructed by φ data points, E(*) represents a desire;

$$\overline{c(\varphi)} = \begin{cases} 2H(\varphi - 1) - \frac{2(\varphi - 1)}{\varphi}, & \varphi > 2 \\ 1, & \varphi = 2 \\ 0, & \varphi < 2 \end{cases};$$

wherein, H(i) represents a harmonic number, and by ln(i)+0.5772156649 estimation, 0.5772156649 is an Euler constant;

when the outlier score $s(x, \varphi)$ is less than a pre-set outlier threshold value s, removing corresponding data points to obtain valid logging data C={$c_1, \ldots, c_a, \ldots, c_m$}, 1≤a≤m, $c_a \in C$, m represents the number of data points in the valid logging data.

In some preferred embodiments, step S500 specifically comprises:

setting a first data point index where the valid logging data exists as a second data point index;

according to another aspect of the present invention, there is provided a system for intelligent removal of multi-dimensional logging data outliers, the system comprises:

a multi-dimensional curve data acquisition module configured to acquire a multi-dimensional logging curve;

a curve dimensionality reduction module configured to obtain two-dimensional logging curve data by using the Umap dimensionality reduction algorithm to perform dimensionality reduction based on the multi-dimensional logging curve data;

a first data point index establishing module configured to establish a first data point index of the multi-dimensional logging curve and the two-dimensional logging curve data based on the two-dimensional logging curve data;

an outlier removal module configured to obtain valid logging data by processing outliers with an isolation forest algorithm based on the two-dimensional logging curve data;

a second data point index acquisition module configured to acquire a second data point index based on the first data point index and valid logging data;

a secondary removal module configured to find marked data points where the second data point index exists in the multi-dimensional logging curve based on the second data point index and record the set of marked data points as standard logging curve data.

Advantageous Effects of the Present Invention:

(1) The present invention quickly captures the main information of the multi-dimensional logging curve through a dimensionality reduction algorithm based on machine learning and automatically achieves the effect of minimum intra-class spacing and maximum inter-class spacing of data points. The dimension-reduced data sample points are input into the isolation forest algorithm model for rapid training and discrimination to achieve the removal of outlier data points and improve the calculation speed of outlier removal.

BRIEF DESCRIPTION OF DRAWINGS

Other features, objects, and advantages of the present application will become more apparent upon reading the detailed description of non-limiting embodiments with reference to the following drawings.

DETAILED DESCRIPTION OF THE EMBODIMENTS

The present application will now be described in further detail with reference to the accompanying drawings and examples. It should be understood that the particular embodiments described herein are illustrative only and are not restrictive. It is further noted that, for ease of description, only parts that are relevant to the invention are shown in the drawings.

It is noted that the embodiments and features of the embodiments in the present application can be combined with each other without conflict. The present application will now be described in detail in connection with the embodiments with reference to the accompanying drawings.

Figure 1:
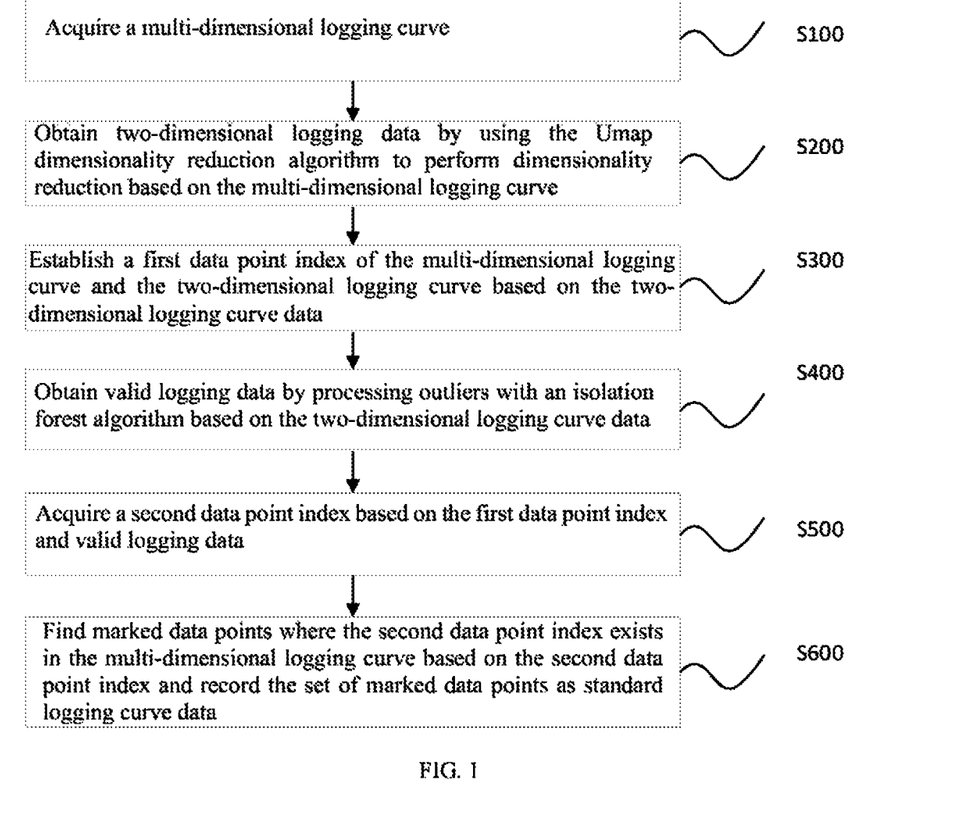
FIG. 1 is a flow diagram of a method for intelligent removal of multi-dimensional logging data outliers in an embodiment of the present invention.

In order to more clearly describe the method for intelligent removal of multi-dimensional logging data outliers according to the present invention, the steps of an embodiment of the present invention will be described in detail with reference to FIG. 1.

The method for intelligent removal of multi-dimensional logging data outliers according to the first embodiment of the present invention comprises steps S100-S600, and each step is described in detail as follows:

step S100, acquiring multi-dimensional logging curve data; in the embodiment, the multi-dimensional logging curve data comprises radioactive gamma ray GR, spontaneous potential SP, caliper CAL, density DEN, compensated neutron log CNL, porosity POR, laterolog deep resistivity RD, and laterolog shallow resistivity RS.

step S200, obtaining two-dimensional logging curve data by using the Umap dimensionality reduction algorithm to perform dimensionality reduction based on the multi-dimensional logging curve data;

the Umap algorithm has two main steps:

one is to learn manifold structure in high-dimensional space

Correct distance between samples in space according to manifold structure and data density: assume that the data points are uniformly distributed on the manifold, the sparse region is contracted, the dense region is stretched, and the distance between each sample point and the farthest nearest neighbor point is corrected as the unit distance.

In the embodiment, the step S200 specifically comprises:

step S210, determining a hyper-parameter of the Umap dimensionality reduction model, comprising a lower limit of the number of adjacent points local_connectivity and the number of neighbor points n_neighbors; the number of neighbor points is to specify how many neighbor points each data point contains;

step S220, setting the weight of the adjacent points contained in the lower limit of the number of adjacent points as 100%;

taking n_neighbors neighbors closest to the current data point as a fuzzy region, setting the weights of the neighbors in the fuzzy region to vary with distance, and setting the weights of data points of non-adjacent points and non-neighbor points as 0;

a small n_neighbors can accurately capture the details of the structure when partial interpretation is required. When our estimation is based on larger regions, larger n_neighbors values can generalize the entire manifold space. Therefore, we control how UMAP balances local and global structures in the data by limiting the n_neighbors value of the size of the local neighborhood when trying to learn manifold structures.

the weight of the data points in the fuzzy region varying with distance is specifically:

$$p_{j|i} = \exp((-dist(x_i, x_j) - p_j)/\sigma_i);$$

$p_j$ represents a distance between the $j^{th}$ sample point and the closest neighbor point, $\sigma_i$ represents a parameter pre-set according to the distance between the $i^{th}$ sample point and the $j^{th}$ sample point, the $i^{th}$ sample point represents any sample point, $p_{j|i}$ represents a weight of the sample point j with respect to the sample point i, $x_i$ represents a value of the $i^{th}$ sample point, $x_j$ represents a value of the j'h sample point, and dist( ) represents a distance;

after traversing each point, it is inevitable that the edge weights are not aligned, and the weights need to be combined.

step S230, combining the edge weights of the data points:

$$p_{j,i} = (p_{j|i} + p_{i|j}) - p_{j|i}p_{i|j};$$

$p_{j|i}$ represents the weight of the sample point j with respect to the sample point i, $p_{i|j}$ represents the weight of the sample point i with respect to the sample point j, and $p_{j,i}$ represents the edge weight of the sample point j and i;

obtaining a weight adjacency graph;

step S240, setting a cross entropy target function based on the weight adjacency graph, and adjusting model parameters via a stochastic gradient descent algorithm; selecting a sample point of epoch from a sample data set, calculating a target function, calculating a current gradient vector, selecting a preset learning rate (step length), and correcting model parameters a and b until the target function reaches a preset threshold value, and obtaining two-dimensional logging curve data.

In some preferred embodiments, step S240 specifically comprises:

step S241, determining a minimum distance hyper-parameter min_dist based on the weight adjacency graph, representing the closest distance of two points in a low-dimensional space; min_dist determines the aggregation degree of points in low-dimensional space;

step S242, constructing a cross entropy target function based on the minimum distance hyper-parameter min_dist:

$$J = \sum_{e_{i,j} \in \varepsilon} p_{i,j} \log \frac{p_{i,j}}{q_{i,j}} + (1 - p_{i,j}) \log \frac{(1 - p_{i,j})}{(1 - q_{i,j})};$$

Figure 2:
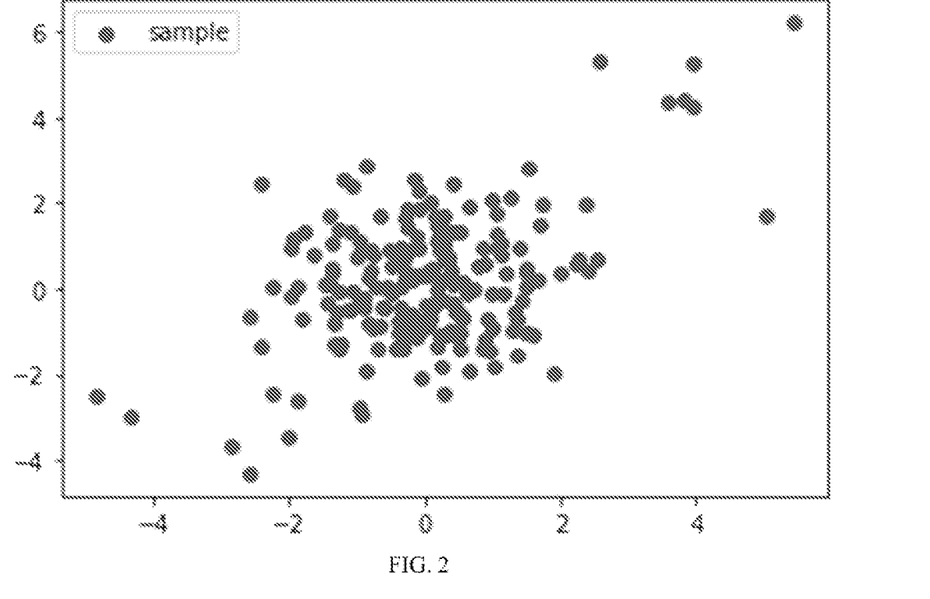
FIG. 2 is a diagram of two-dimensional logging orientation data acquired by the method for intelligent removal of multi-dimensional logging data outliers in an embodiment of the present invention.

J represents a value of a cross entropy target function, $e_{i,j}$ represents two sample points i and j selected from a selected epoch sample set, $\varepsilon$ represents a selected epoch sample set, $p_{i,j}$ represents edge weights of the sample points i and j (with directions), and $q_{i,j}$ represents a distance between a data point corresponding to the $i^{th}$ sample point in a low-dimensional space and a data point corresponding to the $j^{th}$ sample point in the low-dimensional space; the edge weights comprise direction information;

$$q_{i,j} = (1 + a\|z_j - z_i\|^{2b})^{-1};$$

a and b represent parameters determined according to a minimum distance hyper-parameter min_dist;

$$(1 + a\|z_j - z_i\|^{2b})^{-1} = \begin{cases} 1 & \|z_j - z_i\| \le \min\_dist \\ e^{-\|z_j - z_i\| - \min\_dist} & \|z_j - z_i\| > \min\_dist \end{cases};$$

wherein, $z_j$ represents the coordinate of the sample point in the low-dimensional space, and $z_i$ represents the coordinate of the sample point i in the low-dimensional space;

step S243, adjusting model parameters via a stochastic gradient descent algorithm until the target function reaches a pre-set threshold value to obtain two-dimensional logging curve data. The transformation of the two-dimensional logging curve data into a scatter plot is shown in FIG. 2.

This embodiment can measure the difference information between the data according to the manifold structure through the dimensionality reduction method of manifold learning and automatically cluster to realize the mapping from high-dimensional to low-dimensional space, so as to facilitate the automatic division and integration of the data.

In the process of testing, the method of t-SNE is used to perform dimensionality reduction, but when calculating the distance of high dimension, the t-SNE algorithm needs to calculate the distance between all points, adjusting the soft boundary between the global structure and the local structure by Perplexity parameter, and then when outliers are removed by the isolation forest algorithm, the insufficient discrimination leads to the decrease of experimental accuracy; at the same time, the calculation methods of information loss are different. t-SNE uses KL divergence to measure the information loss, and there is a possibility of distortion in the global structure, which further affects the experimental accuracy. However, the scheme considers the high dimension of the logging curve in geophysical data, Umap algorithm is used to perform dimensionality reduction. The Umap algorithm only calculates the distance between each point and the nearest k points, which strictly limits the local range, which is conducive to improving the accuracy and speed of outlier removal through the isolation forest algorithm. Furthermore, after Umap algorithm is selected, the binary cross entropy is used to calculate, both global and local structures are reserved, so the distance between outlier points and non-outlier points is increased, which is better for removing outliers. Compared with the t-SNE algorithm, the Umap algorithm can distinguish the outlier from the normal value of the multi-dimensional logging curve, which is beneficial to the random forest algorithm to remove the outliers more quickly and avoid the normal value of random forest. In this application scenario, the normal value of any log curve cannot be easily deleted.

Step S300, establishing a first data point index of the multi-dimensional logging curve and the two-dimensional logging curve data based on the two-dimensional logging curve data; in the embodiment, the first data point index is specifically a one-to-one mapping between a data point in a multi-dimensional logging curve and a data point in a two-dimensional logging curve data.

Step S400, obtaining valid logging data by processing outliers with an isolation forest algorithm based on the two-dimensional logging curve data;

in the embodiment, the step S400 specifically comprises:

step S410, randomly extracting $\varphi$ data points from the two-dimensional logging curve data X to constitute a data subset X' to be processed and storing same into a root node;

step S420, randomly selecting a dimension q from the two-dimensional logging curve data X, and randomly generating a cut point p in the dimension q; wherein the cut point p satisfies $$\min(x_{ij}, j = q, x_{ij} \in X') < p < \max(x_{ij}, j = q, x_{ij} \in X'),$$

represents a sequence number;

step S430, generating a hyperplane dividing the data in the dimension q into two subspaces according to the cut point p, placing a data point of the dimension q with a numerical value less than p into a first leaf node, and placing a data point with a numerical value greater than or equal to p into a second leaf node;

step S440, recursing the method described in steps S420 to S430 until all the leaf nodes have only one data point or the isolation tree has reached a pre-set height;

step S450, repeating the method described in steps S420 to S440 until T isolation trees are generated; wherein T isolation trees represent: the isolation tree has no external nodes of leaf nodes, or has two leaf nodes $\{T_l, T_r\}$ and an internal node test; an internal node test in T isolation trees is composed of a dimension q and a cutting point p, wherein the point q<p belongs to $T_l$, otherwise belongs to $T_r$;

step S460, the T isolation trees are isolation tree forests, and each data point $x_i$ is traversed through each isolation tree, and the height $h(x_i)$ of the data point $x_i$ in each isolation tree is calculated, namely, the number of edges that the data points $x_i$ pass through from the root node to the leaf node of the isolation tree; then the average height of the data points $x_i$ in the isolation tree forest is calculated, and the average height of all the data points is normalized to obtain the normalized average height $\overline{h(x_1)}$ of the data points;

step S470, calculating an outlier score $s(x, \varphi)$ based on the normalized average height $\overline{h(x_1)}$ of the data points:

$$s(x, \varphi) = 2^{\frac{E(\overline{h(x_i)})}{\overline{c(\varphi)}}};$$

wherein, $\overline{c(\varphi)}$ represents an average value of path lengths of a binary tree constructed by $\varphi$ data points, E(*) represents a desire;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

wherein, H(i) represents a harmonic number, and by ln(i)+0.5772156649 estimation, 0.5772156649 is an Euler constant;

when the outlier score $s(x, \varphi)$ is less than a pre-set outlier threshold value s, removing corresponding data points to obtain valid logging data $C=\{c_1, \ldots, c_a, \ldots, c_m\}$, $1 \leq a \leq m$, $c_a \in C$, and m represents the number of data points in the valid logging data.

Step S500, acquiring a second data point index based on the first data point index and valid logging data; in the embodiment, step S500 specifically comprises:

setting a first data point index where the valid logging data exists as a second data point index;

The second data point index refers to an index of sample points that are left after outliers are removed by the isolation forest algorithm, and the first data point index comprises the second data point index; the original multi-dimensional logging curve may have a case where a sample point has multiple parameters, and the sample point is marked with a first data point index; the processed two-dimensional logging curve data may have two parameters for a sample point marked with a second data point index.

Step S600, finding marked data points where the second data point index exists in the multi-dimensional logging curve based on the second data point index, and recording the set of marked data points as standard logging curve data.

Although the foregoing embodiments describe the steps in sequential order, those skilled in the art will appreciate that the various steps need not be performed in such an order to achieve the benefits of the present embodiments, and that they may be performed simultaneously (in parallel) or in an inverted order, and that such simple variations are within the scope of the present invention.

A system for intelligent removal of multi-dimensional logging data outliers according to a second embodiment of the present invention comprises:

a multi-dimensional curve data acquisition module configured to acquire a multi-dimensional logging curve;

a curve dimensionality reduction module configured to obtain two-dimensional logging curve data by using the Umap dimensionality reduction algorithm to perform dimensionality reduction based on the multi-dimensional logging curve;

a first data point index establishing module configured to establish a first data point index of the multi-dimensional logging curve and the two-dimensional logging curve data based on the two-dimensional logging curve data;

an outlier removal module configured to obtain valid logging data by processing outliers with an isolation forest algorithm based on the two-dimensional logging curve data;

a second data point index acquisition module configured to acquire a second data point index based on the first data point index and valid logging data;

a secondary removal module configured to find marked data points where the second data point index exists in the multi-dimensional logging curve based on the second data point index and record the set of marked data points as standard logging curve data.

It will be clear to a person skilled in the art that, for the convenience and brevity of the description, reference will be made to the corresponding processes in the embodiments of the method described above for the specific working processes of the system described above and the related description, which will not be repeated here.

It should be noted that the system for intelligent removal of multi-dimensional logging data outliers provided in the above-mentioned embodiment is merely exemplified by the division of the above-mentioned functional modules, and in practical applications, the above-mentioned functional allocation may be performed by different functional modules according to needs, i.e. the modules or steps in the embodiments of the present invention are re-decomposed or combined, for example, the modules in the above-mentioned embodiments may be combined into one module, or may be further divided into a plurality of sub-modules, so as to perform all or part of the functions described above. The names of the modules and steps involved in the embodiments of the present invention are merely to distinguish between the various modules or steps and are not to be construed as unduly limiting the present invention.

It will be clear to a person skilled in the art that, for the convenience and brevity of the description, reference may be made to the corresponding processes in the foregoing embodiments of the method, and that the detailed description of the storage means, the processing means and the related description may not be repeated here.

Those skilled in the art should appreciate that the various illustrative modules, method steps, and programs described in connection with the embodiments disclosed herein may be implemented as electronic hardware, computer software, or combinations of both and that the corresponding software modules, method steps, and programs may be located in a random access memory (RAM), memory, read-only memory (ROM), electrically programmable ROM, electrically erasable programmable ROM, register, hard disk, removable disk, CD-ROM, or any other form of storage medium known in the field. To clearly illustrate this interchangeability of electronic hardware and software, various illustrative components and steps have been described above generally in terms of their functionality. Whether such functionality is implemented as electronic hardware or software depends upon the particular application and design constraints imposed on the implementation. Skilled artisans may implement the described functionality in varying ways for each particular application, but such implementation decisions should not be interpreted as causing a departure from the scope of the present invention.

The terms "first", "second", and the like are used for distinguishing between similar objects and not for describing or representing a particular sequential or chronological order.

The terms "comprises", "comprising", or any other similar language, are intended to cover a non-exclusive inclusion, such that a process, method, article, or apparatus that comprises a list of elements does not comprise only those elements but may comprise other elements not expressly listed or inherent to such process, method, article, or apparatus.

So far, the technical solutions of the present invention have been described with reference to the preferred embodiments shown in the accompanying drawings, but it is readily understood by those skilled in the art that the scope of protection of the present invention is obviously not limited to these specific embodiments. Equivalent changes or substitutions may be made by those skilled in the art to the relevant features without departing from the principles of the present invention, and all such changes or substitutions are intended to be within the scope of the present invention.

What is claimed is:

1. A computer-implemented method for intelligent removal of multi-dimensional logging data outliers, performed by one or more processors of a computing device, wherein the method comprises:

acquiring a multi-dimensional logging curve;

obtaining two-dimensional logging curve data by using Umap dimensionality reduction algorithm to perform dimensionality reduction based on the multi-dimensional logging curve, wherein the obtaining two-dimensional logging curve data, specifically comprising:

determining a hyper-parameter of a Umap dimensionality reduction model, comprising a lower limit of the number of adjacent points local_connectivity and the number of neighbor points n_neighbors;

setting the weight of the adjacent points contained in the lower limit of the number of adjacent points as 100%;

taking n_neighbors neighbors closest to a current data point as a fuzzy region, setting weights of the neighbors in the fuzzy region to vary with distance, and setting weights of data points of non-adjacent points and non-neighbor points as 0;

the weight of the data points in the fuzzy region varying with distance is specifically:

$$p_{j|i} = \exp(([-dist(x_i, x_j) - p_j]/\sigma_i);$$

$P_j$ represents a distance between a $j^{th}$ sample point and a closest neighbor point, $\sigma_i$ represents a parameter pre-set according to a distance between an $i^{th}$ sample point and a $j^{th}$ sample point, the $i^{th}$ sample point represents any sample point, $P_{j|i}$ represents a weight of the sample point j with respect to the sample point i, $x_i$ represents a value of the $i^{th}$ sample point, $x_j$ represents a value of the $j^{th}$ sample point, and dist( ) represents the distance;

combining edge weights of the data points:

$$p_{i,j} = (p_{j|i} + p_{i|j}) - p_{j|i}p_{i|j};$$

$p_{j|i}$ represents the weight of the sample point j with respect to the sample point i, $p_{i|j}$ represents the weight of the sample point i with respect to the sample point j, and $P_{j,i}$ represents the edge weight of the sample point ji;

obtaining a weight adjacency graph;

setting a cross entropy target function based on the weight adjacency graph, and adjusting model parameters via a stochastic gradient descent algorithm until the target function reaches a pre-set threshold value to obtain the two-dimensional logging curve data;

specifically comprising:

determining a minimum distance hyper-parameter min_dist based on the weight adjacency graph, representing the closest distance of two points in a low-dimensional space;

constructing a cross entropy target function based on the minimum distance hyper-parameter min_dist:

$$J = \sum_{e_{i,j} \in \varepsilon} p_{i,j} \log \frac{p_{i,j}}{q_{i,j}} + (1 - p_{i,j}) \log \frac{(1 - p_{i,j})}{(1 - q_{i,j})};$$

J represents a value of the cross entropy target function, $e_{i,j}$ represents two sample points i and j selected from a selected epoch sample set, $\varepsilon$ represents the selected epoch sample set, $p_{i,j}$ represents edge weights of the sample points i and j, and $q_{i,j}$ represents the distance between a data point corresponding to the $i^{th}$ sample point in a low-dimensional space and a data point corresponding to the $j^{th}$ sample point in the low-dimensional space; the edge weights comprise direction information;

$$q_{i,j} = \left(1 + a\|z_j - z_i\|^{2b}\right)^{-1};$$

a and b represent parameters determined according to the minimum distance hyper-parameter min_dist;

$$\left(1 + a\|z_j - z_i\|^{2b}\right)^{-1} = \begin{cases} 1 & \|z_j - z_i\| \leq \min\_dist \\ e^{-\|z_j - z_i\| - \min\_dist} & \|z_j - z_i\| > \min\_dist \end{cases};$$

wherein, $Z_j$ represents a coordinate of the sample point j in the low-dimensional space, and $Z_i$ represents a coordinate of the sample point i in the low-dimensional space;

adjusting model parameters via a stochastic gradient descent algorithm until the target function reaches a pre-set threshold value to obtain the two-dimensional logging curve data;

establishing a first data point index of the multi-dimensional logging curve and the two-dimensional logging curve data based on the two-dimensional logging curve data;

the first data point index is specifically a one-to-one mapping between a data point in the multi-dimensional logging curve and a data point in the two-dimensional logging curve data;

obtaining valid logging data by processing outliers with an isolation forest algorithm based on the two-dimensional logging curve data;

acquiring a second data point index based on the first data point index and the valid logging data; specifically comprising setting the first data point index where the valid logging data exists as the second data point index;

finding marked data points where the second data point index exists in the multi-dimensional logging curve based on the second data point index, recording a set of marked data points as standard logging curve data, and then constructing a geological model based on the standard logging curve data.

2. The method for intelligent removal of multi-dimensional logging data outliers of claim 1, wherein the multi-dimensional logging curve comprises: radioactive gamma ray GR, spontaneous potential SP, caliper CAL, density DEN, compensated neutron log CNL, porosity POR, laterolog deep resistivity RD, and laterolog shallow resistivity RS.

3. The method for intelligent removal of the multi-dimensional logging data outliers of claim 1, wherein the step S400 specifically comprises:

randomly extracting $\varphi$ data points from the two-dimensional logging curve data X to constitute a data subset X' to be processed and storing same into a root node;

randomly selecting a dimension q from the two-dimensional logging curve data X, and randomly generating a cut point p in the dimension q; wherein the cut point p satisfies $$\min(x_{ij}, j = q, x_{ij} \in X') < p < \max(x_{ij}, j = q, x_{ij} \in X'),$$

represents a sequence number;

generating a hyperplane dividing the data in the dimension q into two subspaces according to the cut point p, placing a data point of the dimension q with a numerical value less than p into a first leaf node, and placing a data point with a numerical value greater than or equal to p into a second leaf node;

recursing the method described in steps S420 to S430 until all the leaf nodes have only one data point or an isolation tree has reached a pre-set height;

repeating the method described in steps S420 to S440 until T isolation trees are generated; wherein the T isolation trees represent: the isolation tree has no external nodes of leaf nodes, or has two leaf nodes $\{T_l, T_r\}$ and an internal node test; the internal node test in the T isolation tree is composed of a dimension q and a cutting point p, wherein the point q<p belongs to $T_l$, otherwise belongs to $T_r$;

the T isolation trees are isolation tree forests, and each data point $x_i$ is traversed through each isolation tree, and the height $h(x_i)$ of the data point $x_i$ in each isolation tree is calculated, namely, the number of edges that the data points $x_i$ pass through from the root node to the leaf node of the isolation tree; then an average height of the data points $x_i$ in the isolation tree forest is calculated, and the average height of all the data points is normalized to obtain a normalized average height $\overline{h(x_i)}$ of the data points;

calculating an outlier score $s(x, \varphi)$ based on the normalized average height $\overline{h(x_i)}$ of the data points:

$$s(x, \varphi) = 2^{\frac{E(\overline{h(x_i)})}{\overline{c(\varphi)}}};$$

wherein, $\overline{c(\varphi)}$ represents an average value of path lengths of a binary tree constructed by $\varphi$ data points, E(*) represents a desire;

$$\overline{c(\varphi)} = \begin{cases} 2H(\varphi - 1) - \frac{2(\varphi - 1)}{\varphi}, & \varphi > 2 \\ 1, & \varphi = 2 \\ 0, & \varphi < 2 \end{cases};$$

wherein, H(i) represents a harmonic number, and by ln(i)+0.5772156649 estimation, 0.5772156649 is an Euler constant; when the outlier score $s(x, \varphi)$ is less than a pre-set outlier threshold value s, removing corresponding data points to obtain valid logging data $C=\{c_1, \ldots, c_\alpha, \ldots c_m\}$, $1 \leq \alpha \leq m$, $c_\alpha \geq C$, and m represents the number of data points in the valid logging data.

4. A system for intelligent removal of multi-dimensional logging data outliers, wherein the system comprises at least one processor; a memory coupled to the at least one processor and storing instructions that, when executed by the at least one processor, configure the system to perform the following operations:

a multi-dimensional curve data acquisition module configured to acquire a multi-dimensional logging curve;

a curve dimensionality reduction module configured to obtain two-dimensional logging curve data by using Umap dimensionality reduction algorithm to perform dimensionality reduction based on the multi-dimensional logging curve;

specifically comprise:

determining a hyper-parameter of a Umap dimensionality reduction model, comprising a lower limit of the number of adjacent points local_connectivity and the number of neighbor points n_neighbors;

setting a weight of the adjacent points contained in the lower limit of the number of adjacent points as 100%;

taking n_neighbors neighbors closest to a current data point as a fuzzy region, setting weights of the neighbors in the fuzzy region to vary with distance, and setting weights of data points of non-adjacent points and non-neighbor points as 0;

the weight of the data points in the fuzzy region varying with distance is specifically:

$$p_{j|i} = \exp(([-dist(x_i, x_j) - p_j]/\sigma_i);$$

$p_j$ represents a distance between a $j^{th}$ sample point and a closest neighbor point, $\varphi_i$ represents a parameter pre-set according to a distance between an $i^{th}$ sample point and a $j^{th}$ sample point, the $i^{th}$ sample point represents any sample point, $P_{j|i}$ represents a weight of the sample point j with respect to the sample point i, $x_i$ represents a value of the $i^{th}$ sample point, $x_j$ represents a value of the $j^{th}$ sample point, and dist ( ) represents the distance;

combining edge weights of the data points:

$$p_{i,j} = (p_{j|i} + p_{i|j}) - p_{j|i}p_{i|j};$$

$P_{j|i}$ represents the weight of the sample point j with respect to the sample point i, $P_{i|j}$ represents the weight of the sample point i with respect to the sample point j, and $p_{j,i}$ represents the edge weight of the sample point ji;

obtaining a weight adjacency graph;

setting a cross entropy target function based on the weight adjacency graph, and adjusting model parameters via a stochastic gradient descent algorithm until the target function reaches a pre-set threshold value to obtain the two-dimensional logging curve data;

specifically comprising:

determining a minimum distance hyper-parameter min_dist based on the weight adjacency graph, representing the closest distance of two points in a low-dimensional space;

constructing a cross entropy target function based on the minimum distance hyper-parameter min_dist:

$$J = \sum_{e_{i,j} \in \varepsilon} p_{i,j} \log \frac{p_{i,j}}{q_{i,j}} + (1 - p_{i,j}) \log \frac{(1 - p_{i,j})}{(1 - q_{i,j})};$$

J represents a value of the cross entropy target function, $e_{i,j}$ represents two sample points i and j selected from a selected epoch sample set, $\varepsilon$ represents the selected epoch sample set, $p_{i,j}$ represents edge weights of the sample points i and j, and $q_{i,j}$ represents the distance between a data point corresponding to the $i^{th}$ sample point in a low-dimensional space and a data point corresponding to the $j^{th}$ sample point in the low-dimensional space; the edge weights comprise direction information;

$$q_{i,j} = (1 + a\|z_j - z_i\|^{2b})^{-1};$$

a and b represent parameters determined according to the minimum distance hyper-parameter min_dist;

$$(1 + a\|z_j - z_i\|^{2b})^{-1} = \begin{cases} 1 & \|z_j - z_i\| \leq \min\_dist \\ e^{-\|z_j - z_i\| - \min\_dist} & \|z_j - z_i\| > \min\_dist \end{cases};$$

wherein, $z_j$, represents a coordinate of the sample point j in the low-dimensional space, and $z_i$ represents a coordinate of the sample point i in the low-dimensional space;

adjusting model parameters via a stochastic gradient descent algorithm until the target function reaches a pre-set threshold value to obtain the two-dimensional logging curve data;

a first data point index establishing module configured to establish a first data point index of the multi-dimensional logging curve and the two-dimensional logging curve data based on the two-dimensional logging curve data;

the first data point index is specifically a one-to-one mapping between a data point in the multi-dimensional logging curve and a data point in the two-dimensional logging curve data;

an outlier removal module configured to obtain valid logging data by processing outliers with an isolation forest algorithm based on the two-dimensional logging curve data;

a second data point index acquisition module configured to acquire a second data point index based on the first data point index and the valid logging data; specifically comprising setting the first data point index where the valid logging data exists as the second data point index;

a secondary removal module configured to find marked data points where the second data point index exists in the multi-dimensional logging curve based on the second data point index, and record a set of marked data points as standard logging curve data, and then construct a geological model using the standard logging curve data.

* * * * *